United States Patent [19]

Ishikawa et al.

[11] Patent Number: 5,054,913
[45] Date of Patent: Oct. 8, 1991

[54] METHOD AND APPARATUS FOR MEASURING THE VELOCITY OF A FLUID USING ANALYSIS OF YOUNG'S FRINGES IN SPECKLE PHOTOGRAPHY

[75] Inventors: Muneharu Ishikawa, Ryuugasaki; Ayafumi Taniji, Tsukuba, both of Japan

[73] Assignee: Kowa Company Ltd., Japan

[21] Appl. No.: 510,292

[22] Filed: Apr. 16, 1990

[30] Foreign Application Priority Data

Apr. 21, 1989 [JP] Japan .................................. 1-100115

[51] Int. Cl.$^5$ .......................... G01P 3/36; G06E 1/04; G06G 7/19
[52] U.S. Cl. .................................... 356/28.5; 250/233; 250/237 R; 73/861.05; 73/861.06; 364/713; 364/822; 364/827
[58] Field of Search ................. 356/28, 28.5; 250/233, 250/237 R; 73/861.05, 861.06; 364/713, 822, 827

[56] References Cited

U.S. PATENT DOCUMENTS 4,866,639 9/1989 Adrian .............................. 356/28 X
4,925,296 5/1990 Reichmuth ............................ 356/28

OTHER PUBLICATIONS

Taniji et al., Spatial Modulating Analysis of the Young's Fringes by a Rotary Slit and a Liquid Crystal Television, (ICO-15, West Germany), SPIE, vol. 1319 (1990.8), p. 262.

*Primary Examiner*—Linda J. Wallace
*Attorney, Agent, or Firm*—Bruce L. Adams; Van C. Wilks

[57] ABSTRACT

A method and apparatus for measuring the velocity of a fluid in which a double-exposure image of the speckle pattern or particle images of tracer particle in a fluid is irradiated with a collimated beam of coherent light, and is subjected to Fourier transformation to produce Young's fringes at its focal plane. A slit is rotated relatively with respect to the double-exposure image to produce changes in the amount of light transmitted by the slit and determine the direction of the fringes. To determine the spacing of the fringes, a variable-spacing grating filter is used which is complementary to the image of the fringes and has a transmission distribution function of $\sin^2$ or $\cos^2$. The thus obtained direction and spacing of the fringes are used to determine the velocity of the fluid.

17 Claims, 5 Drawing Sheets

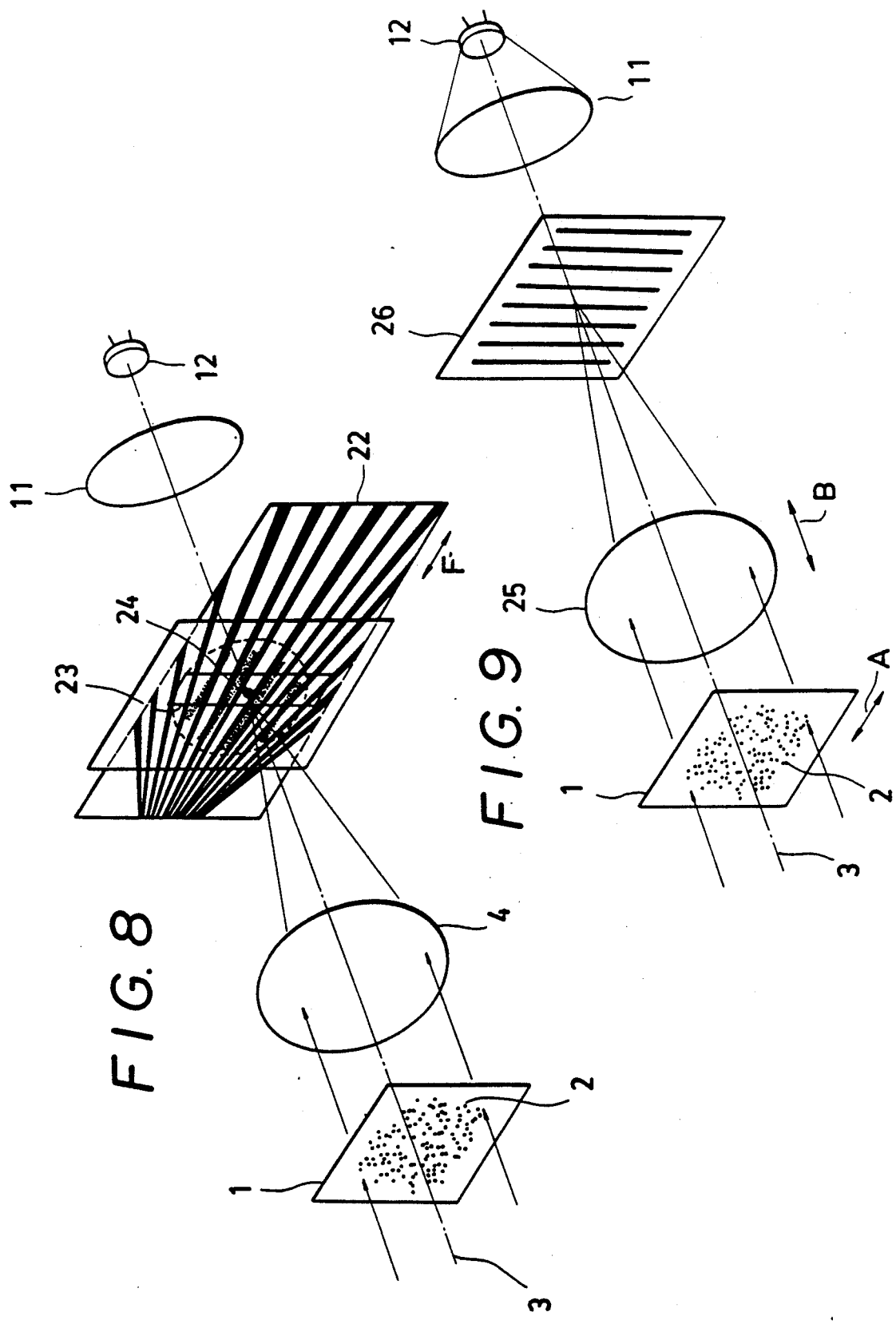

METHOD AND APPARATUS FOR MEASURING THE VELOCITY OF A FLUID USING ANALYSIS OF YOUNG'S FRINGES IN SPECKLE PHOTOGRAPHY

BACKGROUND OF THE INVENTION

1. Field of the Invention

This invention relates to a method and apparatus for measuring the velocity of a fluid, and more particularly to a method and apparatus for measuring the velocity of a fluid in which a double-exposure image of the speckle pattern or particle images of tracer particles in a fluid is irradiated with a collimated beam of coherent light, and is subjected to Fourier transformation through a lens to produce at its focal plane Young's fringes which are analyzed to determine the fringe spacing and direction in order to measure the velocity of the fluid.

2. Description of the Prior Art

Methods of measuring the two-dimensional velocity component of a fluid include the laser speckle method described by T. D. Dudderar and P. G. Simpkins in "Laser speckle photography in a fluid medium," Nature Vol. 270 3 page 45 (November 1977), and the white-light speckle L method described by E. Bernabeu, J. C. Amaré and M. P. Arroyo in "White-light speckle method of measurement of flow velocity distribution," Applied Optics Vol. 21 No. 14, 2583 (1982). These methods utilize the fact that when a fluid is irradiated by a beam of light, the speckle pattern produced by particles in the fluid or the particle image pattern exhibits a translational motion.

The working principle of these methods is to record a speckle or particle image pattern from a fluid flow as a double-exposure image, and the amount of translational movement of the pattern is detected quantitatively by optical processing, using a laser beam. In this case, the displacement of the pattern will correspond to the flow velocity.

A pulsed laser light source or a chopped continuous light source is used to record the double-exposure image, and tracer particles are mixed into the fluid to scatter the light. The fluid containing these tracer particles or scatterers is then irradiated twice by a pulsed beam, and movement of an image of the particles themselves or movement of the speckle pattern is photographed to produce a double-exposure image.

The Young's fringes method is one method used for optical processing of the double-exposure image. When a double-exposure image is irradiated by a collimated beam of laser light, these fringes are produced in the diffracted image of the light passing through a lens and can be observed at the focal plane of the lens. The fringes include information on the velocity of the pattern irradiated by the laser beam and the direction of the normal of the fringes shows the direction of the velocity vector. If the spacing between fringes is d, the wavelength of the irradiating light is λ, the focal length of the lens is f, the magnification at which the double-exposure image is photographed is M and the interval between light pulses is T, then the velocity v of a fluid will satisfy the following relation:

$v = (f\lambda)/(Mdt)$.

The flow velocity can be obtained by optically processing the double-exposure image and analyzing the fringes. Using manual methods to find the spacing and direction of the fringes derived from each point of the double-exposure image is extremely time-consuming and inefficient. One recent solution is to display the fringes on a screen, use a TV camera to record the fringes on the screen and find the velocity using a method based on image-processing techniques. This is described in "Automatic fringe analysis with a computer image-processing system," by D. W. Robinson, Applied Optics, Vol. 22, No. 14, 2169 (1983).

However, image processing increases the complexity of the system, establishing the fluid flow velocity requires considerable time, and overall, the system becomes costly.

SUMMARY OF THE INVENTION

It is therefore an object of the present invention to provide a method and apparatus for measuring the velocity of a fluid which uses the fact that fringes appear as equi-spaced fringes and which is capable of determining the velocity vector of a fluid, that is, the flow direction and speed of the fluid, rapidly and easily.

According to the invention, a double-exposure image of the speckle pattern or particle images of a fluid is irradiated with a collimated beam of coherent light, and is subjected to Fourier transformation through a lens to produce at its focal plane Young's fringes which are analyzed to determine the fringe spacing and direction in order to measure the velocity of the fluid. In this arrangement a slit is disposed at the focal plane of the lens and rotated relatively with respect to the double-exposure image to produce changes in the amount of light transmitted through the slit. The direction of the fringes may be determined based on the changes in the amount of light transmitted through the slit. The thus determined direction of the fringes is used to obtain the direction of the fluid velocity.

The present invention further comprises an arrangement for measuring the spacing of the Young's fringes in which a variable-spacing grating filter which is complementary to the image of the fringes and has a transmission distribution function of $\sin^2$ or $\cos^2$ is disposed at the focal plane of the Fourier lens and the spacing of the filter is changed to produce changes in the amount of light of the Young's fringes transmitted through the filter. The spacing of the Young's fringes may be determined from changes in the amount of light transmitted by the filter relative to changes in the grating spacing of the filter. The thus determined spacing of the Young's fringes is used to obtain the value of the fluid velocity.

Thus, the invention uses the fact that fringes appear as a periodic series of bands in a one-dimensional direction and enables the velocity vector of a fluid, that is, the flow direction and speed of a fluid, to be determined rapidly and easily.

BRIEF DESCRIPTION OF THE DRAWINGS

The objects and features of the present invention will become more apparent from a consideration of the following detailed description taken in conjunction with the accompanying drawings in which:

FIG. 8 shows another arrangement for measuring the spacing of Young's fringes;

FIG. 9 shows a further arrangement for measuring the spacing of Young's fringes;

DESCRIPTION OF THE PREFERRED EMBODIMENTS

Figure 1:
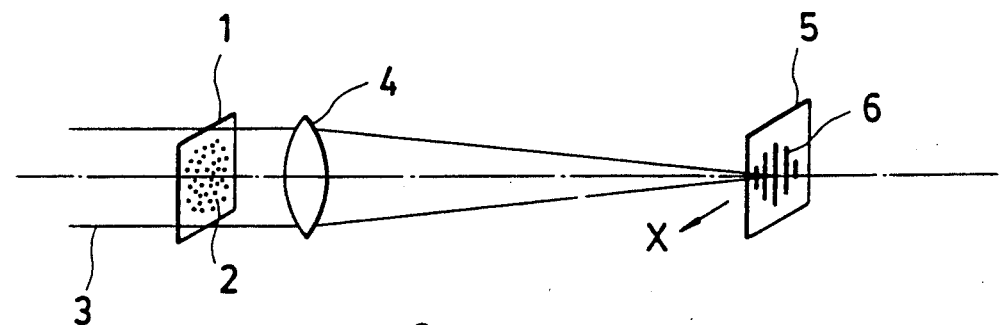
FIG. 1 shows the principle behind the formation of Young's fringes.

FIG. 1 shows the principle behind the formation of Young's fringes. In FIG. 1, reference numeral 1 denotes a multi-exposure film (although reference is to double exposure throughout the description, the invention is not limited thereto). A double-exposure image 2 on the film 1 is irradiated by a collimated laser beam 3 using an optical system (not illustrated), and is imaged by a Fourier transformation lens 4 into an image on a screen 5 to produce Young's fringes 6. The screen 5 is disposed at the focal plane of the Fourier transformation lens 4, that is, at a Fourier transformation plane.

Figure 2:
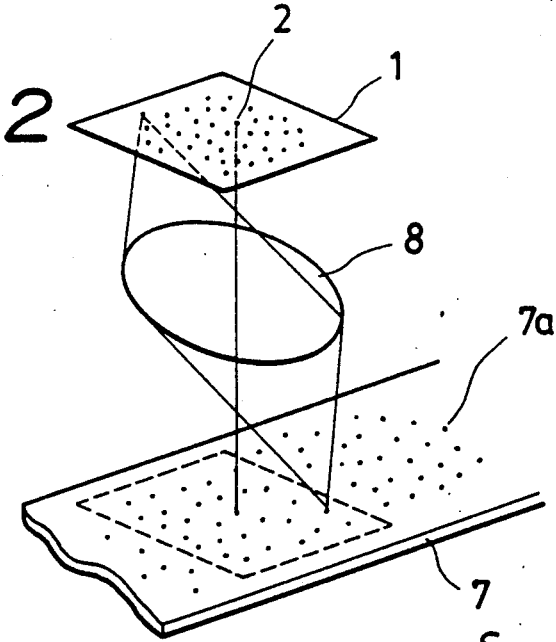
FIG. 2 shows how a double-exposure image is formed.

As shown in FIG. 2, the double-exposure image 2 is formed by using a pulsed light to twice irradiate a fluid 7 which includes tracer particles 7a. Light scattered by the particles is focussed via a lens 8 onto the film 1 which receives a double exposure. The double-exposure image is recorded on the film using a pulsed laser beam or a chopped beam from a continuous light source. When a laser beam is used the double-exposure image is produced by movement of a speckle pattern which can be produced by the movement of the particles. When white light is used the double-exposure image is produced by the movement of the particles themselves.

The Young's fringes 6 produced at the Fourier transformation plane of the double-exposure image thus formed include velocity information relating to the object irradiated by the laser beam, which in this case is the fluid 7. The line x normal to the Young's fringes 6 indicates the direction of the fluid's velocity vector.

It is well known that if the spacing between fringes is d, the wavelength of the irradiating light is λ, the focal length of the lens 4 is f, the magnification at which the double-exposure image 2 is photographed is M and the emission timing of the light source is T, then the velocity v of a fluid will be $$v = (f\lambda)/(Mdt) \quad (1)$$

Figure 3:
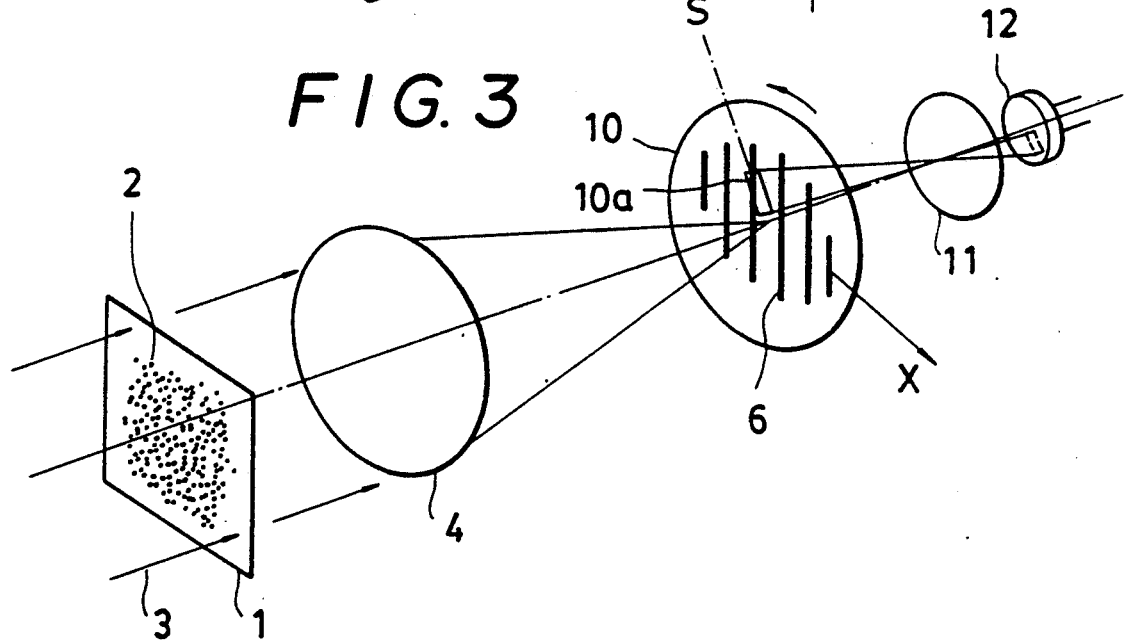
FIG. 3 shows an arrangement for measuring the direction of Young's fringes.
Figures 4, 5:
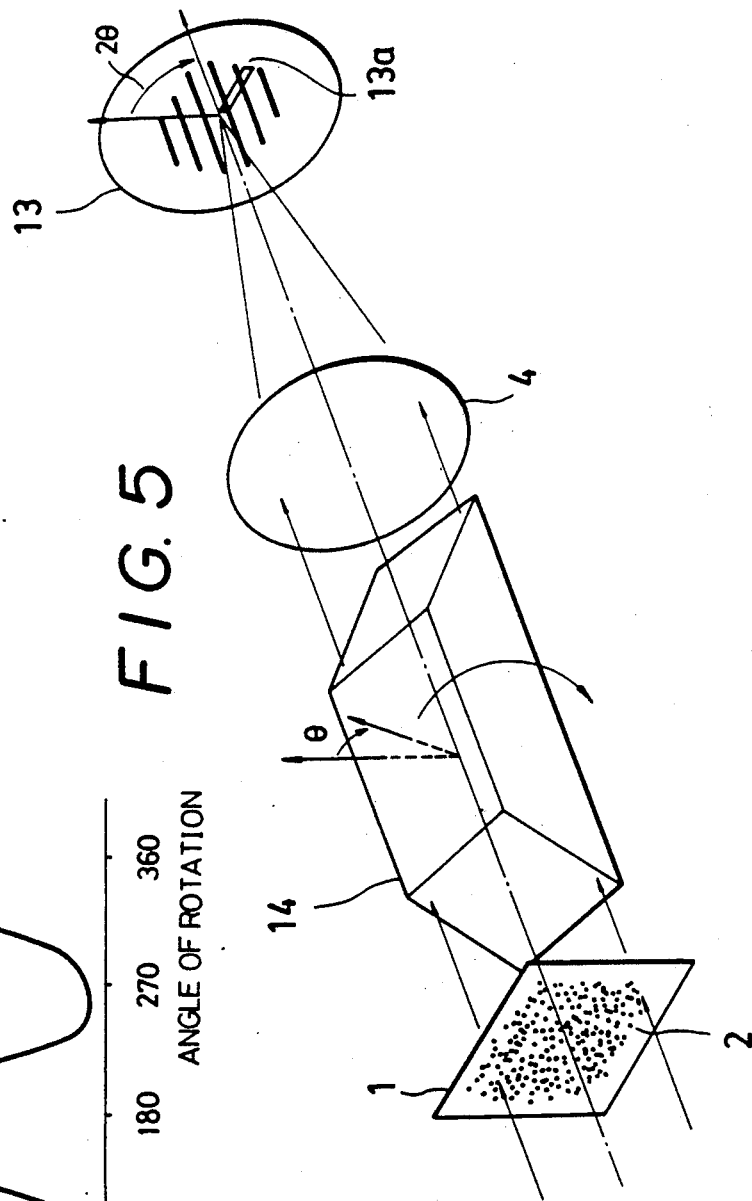
FIG. 4 is a graph showing slit light amount transmission characteristics.
FIG. 5 shows another arrangement for measuring the direction of Young's fringes.

It is also know that the intensity distribution of Young's fringes 6 assumes a $cos^2$ function FIG. 3 shows an embodiment for establishing the direction of the Young's fringes, that is, the direction perpendicular to the direction x of the velocity vector. Here a rotating slit plate 10 with a slit 10a is disposed on the Fourier transformation plane. FIG. 4 shows the characteristics obtained as a function of the angle of rotation if the light passing through the slit 10a is focussed by a focussing lens 11 and the amount of transmitted light is measured by a photosensor 12. Here, 90 degrees is when the normal direction x of the Young's fringes 6 coincide with the radial direction of the rotating slit 10a. As shown in FIG. 4, the amount of transmitted light is at a maximum when the long dimension S of the slit coincides with the Young's fringes orientation Y. Thus, determining the angle of slit rotation that produces the maximum light transmission amount enables the Y and X (normal) orientations of the fringes to be ascertained.

FIG. 5 shows a second embodiment of an arrangement for obtaining the direction of Young's fringes. This embodiment uses a fixed slit plate 13 provided with a slit 13a, and a Dove prism 14 is provided between the double-exposure image 2 and the Fourier transformation lens 4, the Dove prism 14 being rotatable about the optical axis. Rotating the Dove prism 14 also rotates the double-exposure image 2. The Dove prism rotates the image by an amount of twice the angle of its own rotation. Thus, only the half angle is needed to detect the direction of the Young's fringes. In this method, the direction of the fringes can be determined by rotating the slit 13a relative to the fringes. Therefore, as in FIG. 4, the direction of the fringes can be determined by establishing the angle of rotation of the Dove prism at which light passing through the slit reaches a maximum.

Embodiments for measuring the spacing of the fringes after obtaining the direction of the fringes will now be described with reference to FIGS. 6 to 9.

Figure 6:
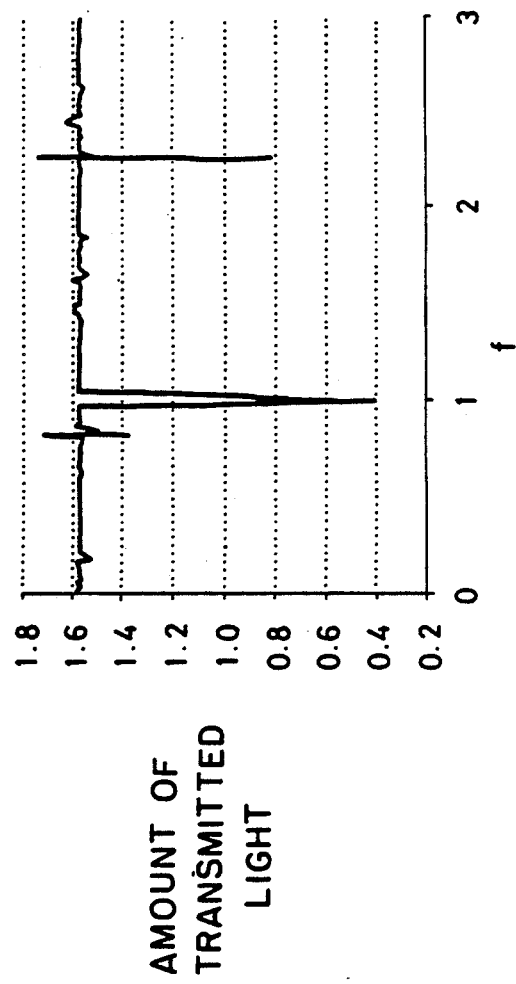
FIG. 6 is a graph showing light transmission amounts plotted against filter grating spacing.

For the Young's fringes generated as explained above, it is well known that the intensity distribution of the fringes takes a squared cosine ($cos^2$) function. When, therefore, a grating filter having a $cos^2$ or $sin^2$ function intensity distribution that is complementary to the distribution of the Young's fringes is disposed at the focal plane of the Fourier transformation lens 4, the amount of light transmitted through the filter will reach a minimum when the spacing of the fringes is the same as the spacing of the filter grating. FIG. 6 shows numerically-computed light transmission amount characteristics. For calculation, filter transmission characteristics are approximated to a $sin^2$ function to perform numerical integration.

In FIG. 6, the horizontal axis f is f (spacing of grating filter)/(spacing of Young's fringes).

FIG. 6 shows that by continuously varying the spacing of the filter grating, it can be inferred that the complementary grating spacing at which the amount of light transmitted reaches a minimum will be the same as the spacing of the Young's fringes.

Figure 7:
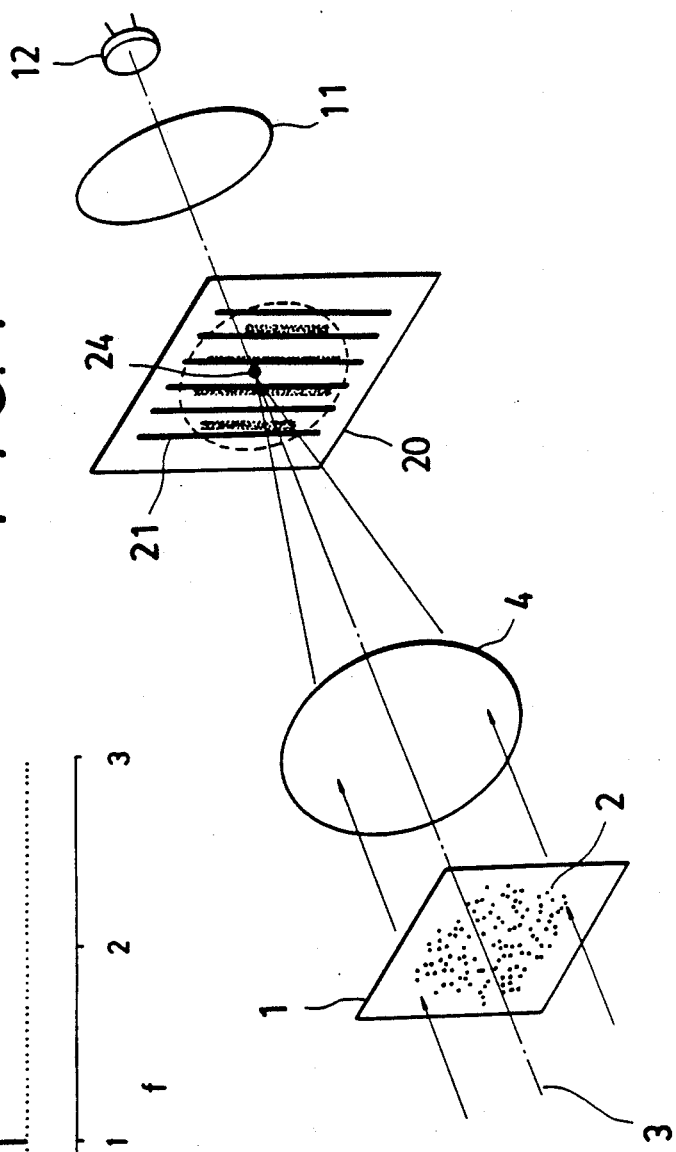
FIG. 7 shows an arrangement for measuring the spacing of Young's fringes.

FIG. 7 shows an arrangement for implementing this. In this embodiment, a light absorbing grating filter constituted by a transmission type liquid-crystal display element is provided at the Fourier transformation plane. This filter 20 has a plurality of variable-spacing gratings 21, so that by varying the spacing of the gratings 21 while using the photosensor 12 to measure the amount of light that is passing through the grating, the grating spacing at which the light amount is at a minimum can be taken as the spacing of the Young's fringes.

In the embodiment shown in FIG. 8, the light absorbing filter has been replaced by a combination of a continuously-changing-pitch filter 22 and a slit 23. The spacing of the grating at the slit 23 can be changed by moving the filter 22 in the direction F, which changes the amount of incident light at the photosensor 12. The black spot 24 shown in FIGS. 7 and 8 is provided to eliminate the focusing beam of the irradiating collimated laser beam.

The embodiment shown in FIG. 9 uses a Fourier transformation lens 25 with a variable focal length to form the Young's fringes of the double-exposure image on a grating filter 26. In this example the grating filter 6 has a fixed spacing. As in the examples shown in FIGS. 7 and 8, the system is arranged so that the displacement direction recorded in the double-exposure image 2 takes place in direction A and the focal length of the Fourier transformation lens 25 changes in direction B. The photosensor 12 is used to detect the amount of light passing through the grating filter 26 via the focussing lens 11 and to find the focal length at which the amount of light is at a minimum. The spacing of the Young's fringes can thus be obtained from equation (1).

Figure 10:
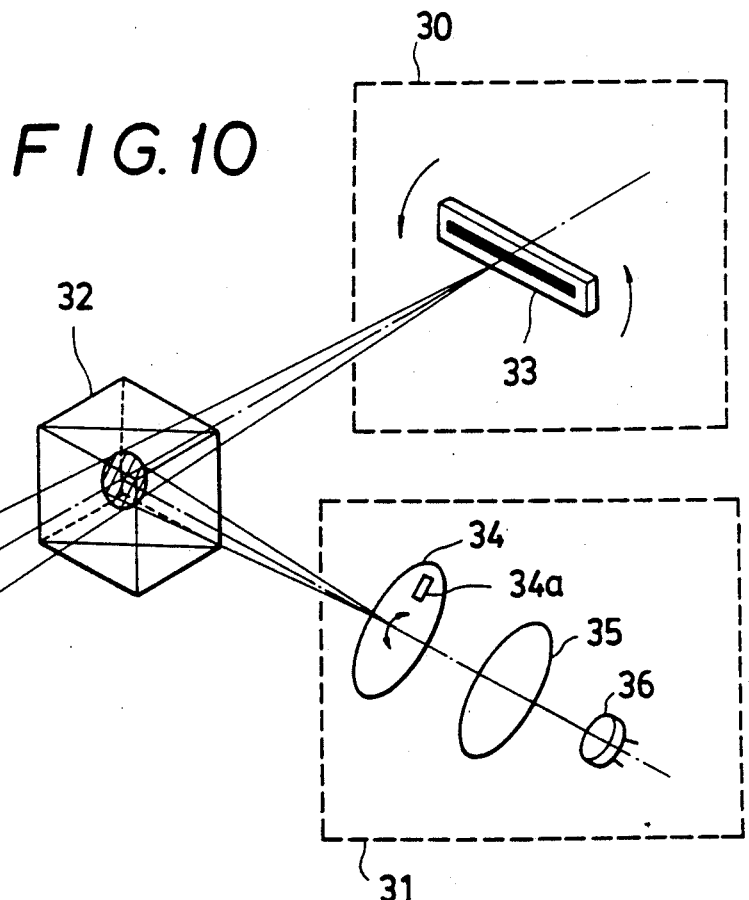
FIG. 10 shows an arrangement for measuring both the direction and the spacing of Young's fringes.

In the examples described above, finding the direction of the Young's fringes is carried out separately from finding the spacing of the fringes. FIG. 10, however, shows an embodiment of a single apparatus which can be used to obtain both fringe direction and fringe spacing. It is assumed that the arrangement will be used to measure first the direction, followed by the spacing.

In the apparatus shown in FIG. 10, the light passes through the double-exposure image 2 and the Fourier transformation lens 4 and is split by a beam splitter 32 so that one part goes to a fringe spacing measurement apparatus 30 and the other part to a fringe direction measurement apparatus 31. Each of the apparatuses 30 and 31 is provided at a Fourier transformation plane. The fringe spacing measurement apparatus 30 is constituted by a line sensor 33 which can be rotated about the optical axis, while the fringe direction measurement apparatus 31 is comprised of a rotating slit plate 34 with a slit 34a, focussing lens 35, and a photosensor 36. The focussing lens 35 serves to focus the light onto the photosensor 36.

Here, too, the direction of the Young's fringes is determined by rotating the slit 34 to find the angle at which the amount of light passing through the slit 34a reaches a maximum. The axis of the line sensor 33 is then aligned with the direction of the fringes thus obtained. When the line sensor 33 has been positioned, the fringe spacing can be measured. Although in FIG. 10 a line sensor is used as the fringe spacing measurement apparatus 30, the spacing may of course be measured using a filter with complementary transmission characteristics to the Young's fringes.

In the above method the fringe spacing measurement apparatus 30 is rotated, but it is also possible to use a Dove prism to rotate the fringe images and omit the two rotating mechanisms at the Fourier transformation plane.

Figure 11:
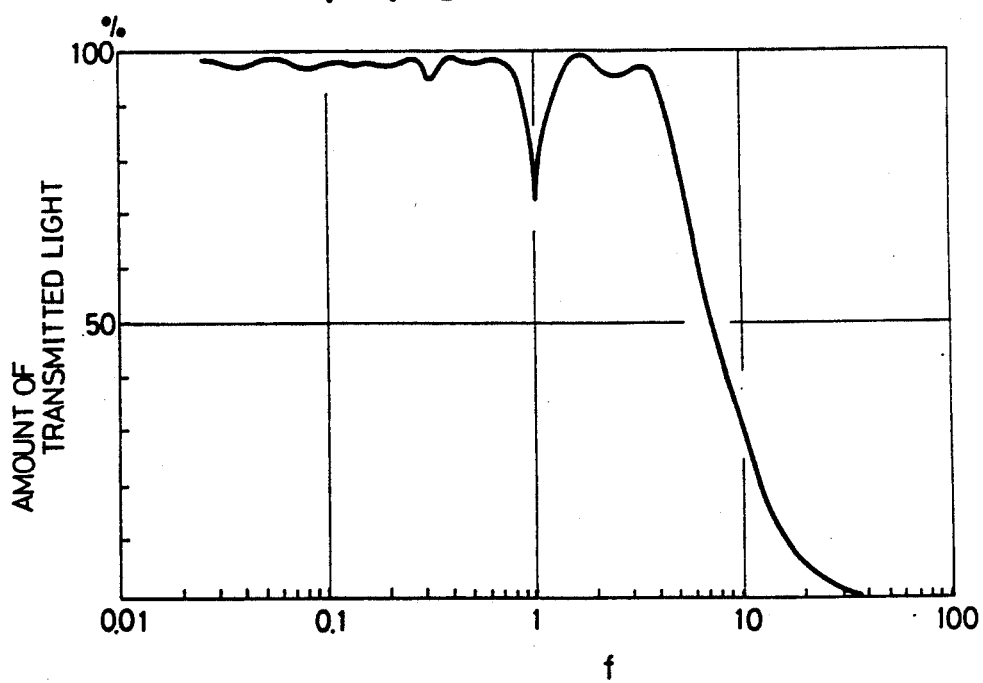
FIG. 11 is a graph showing light transmission amounts plotted against filter grating spacing.

In the embodiments above described, the transmission distribution of the grating filters has been described as having a $\sin^2$ or $\cos^2$ function. It is, however, appreciated that the same effects can be obtained by a grating filter having an exponent of the above function. A necessary condition for the grating filter is, therefore, that its transmission distribution follows a function having a periodicity which is opposite in phase and complementary to the Young's fringes. Taking the detection sensitivity into account, however, it will be recommended to use the grating filter having the periodicity of a $\sin^2$ or $\cos^2$ function It will be noted that the graph as shown in FIG. 6 is shown for the Young's fringes which extend infinitely. Actually, the fringes are finite, so that a too great parameter f causes the grating fringes to cover the finite Young's fringes with the amount of transmitted light being reduced. This is shown in FIG. 11. Since many pseudo minimums appear experimentally as shown in FIG. 6, it is preferable to detect not a local minimum of the amount of light transmitted through the grating filter, but the smallest of the minimums to determine the spacing of the Young's fringes.

In FIG. 7, the light absorption grating filter 20 is comprised of a liquid crystal display element, whose picture elements are rectangular or rhomboid and arranged two-dimensionally. It is, however, not necessary to cause any change in the amount of transmitted light in the direction of the Young's fringes, so that a one-dimensionally arranged, simple liquid crystal display element can preferably be used. Such a one-dimensional liquid crystal element makes it easy to improve the resolution in the one-dimensional direction, thus providing an improvement in controlling a transmission factor of the liquid crystal display element. It is, on the other hand, necessary to use a two-dimensionally arranged liquid crystal display element having small-sized picture elements with high resolution, when the rotating slit is constituted by a liquid crystal display element.

While the invention has been described with reference to preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiments disclosed as the best mode contemplated for carrying out the invention, but that the invention will include all embodiments falling within the scope of the appended claims.

What is claimed is:

1. A method of measuring the velocity of a fluid, in which a double-exposure image of the speckle pattern or particle images of tracer particles in a fluid is irradiated with a collimated beam of coherent light, and is subjected to Fourier transformation through a lens to produce at the focal plan of the lens Young's fringes which are analyzed to determine the spacing and direction of the fringes in order to measure the velocity of the fluid, the improvement comprising:

disposing a slit at the focal plan of the lens; rotating the slit relatively with respect to the double-exposure image to produce changes in the amount of light transmitted through the slit; determining the direction of the fringes from the thus produced changes; and measuring the direction of the fluid velocity using the thus determined fringe direction.

2. A method according to claim 1, wherein the rotating slit is constituted by a liquid-crystal display type element.

3. A method according to claim 1, wherein the double-exposure image is fixed and the slit is rotated.

4. A method according to claim 1, wherein the slit is fixed and the double-exposure image is rotated by a Dove prism.

5. A method of measuring the velocity of a fluid, in which a double-exposure image of the speckle pattern or particle images of tracer particles in a fluid is irradiated with a collimated beam of coherent light, and is subjected to Fourier transformation through a lens to produce at the focal plan of the lens Young's fringes which are analyzed to determine the spacing and direction of the fringes in order to measure the velocity of the fluid, the improvement comprising:

disposing a variable-spacing grating filter which is complementary to the image of the fringes and has a transmission distribution function of $\sin^2$ or $\cos^2$ at the focal plan of the lens; changing the grating spacing the filter to produce changes in the amount of light transmitted by the filter; determining the spacing of the fringes from the thus produced changes; and measuring the value of the fluid velocity using the thus determined fringe spacing.

6. A method according to claim 5, wherein the variable-spacing grating filter is constituted by a transmission type liquid-crystal display element.

7. A method according to claim 5, wherein the variable-spacing grating filter has a grating spacing that is continuously variable along an axis perpendicular to the orientation of the grating, and part of the filter is superimposed on the fringes to produce changes in the amount of transmitted light and determine a complementary fringe spacing from the changes thus produced.

8. An apparatus for measuring the velocity of a fluid, in which a double-exposure image of the speckle pattern or particle images of tracer particles in a fluid is irradiated with a collimated beam of coherent light, and is subjected to Fourier transformation through a lens to produce at the focal plan of the lens Young's fringes which are analyzed to determine the spacing and direction of the fringes in order to measure the velocity of the fluid, comprising:

a transparent medium for recording a double-exposure image;
a lens positioned to receive a collimated beam of laser light transmitted through the double-exposure image for effecting Fourier transformation of the double-exposure image; and
means defining a slit disposed at the focal plan of the lens and rotatable relatively with respect to the Young's fringes corresponding to the double-exposure image to produce changes in the amount of light transmitted through the slit to enable determination of the direction of the fringes from the changes thus produced;
whereby the direction of the fluid velocity can be measured using the thus determined fringe direction.

9. An apparatus for measuring the velocity of a fluid, in which the double-exposure image of the speckle pattern or particle images of tracer particles in a fluid is irradiated with a collimated beam of coherent light, and is subjected to Fourier transformation through a lens to produce at the focal plan of the lens Young's fringes which are analyzed to determine the spacing and direction of the fringes in order to measure the velocity of the fluid, comprising:

a transparent medium for recording a double-exposure image;
a lens positioned to receive a collimated beam of laser light transmitted through the double-exposure image for effecting Fourier transformation of the double-exposure image;
means provided between the lens and the recording medium for rotating the double-exposure image; and
means defining a slit fixedly disposed at the focal plane of the lens and operative in response to rotation of the double-exposure image to produce changes in the amount of light transmitted through the slit to enable determination of the direction of the fringes from the changes thus produced;
whereby the direction of the fluid velocity can be measured using the thus determined fringe direction.

10. An apparatus according to claim 9, wherein the means for rotating the double-exposure image is a Dove prism.

11. An apparatus for measuring the velocity of a fluid, in which a double-exposure image of the speckle pattern or particle images of tracer particles in a fluid is irradiated with a collimated beam of coherent light, and is subjected to Fourier transformation through a lens to produce at the focal plan of the lens Young's fringes which are analyzed to determine the spacing and direction of the fringes in order to measure the velocity of the fluid, comprising:

a transparent medium for recording a double-exposure image;
a lens positioned to receive a collimated beam of laser light transmitted through the double-exposure image for effecting Fourier transformation of the double-exposure image;
a variable-spacing grating filter disposed at the focal plan of the lens and having a transmission distribution function of $\sin^2$ or $\cos^2$ which is complementary to the image of the Young's fringes, the grating spacing of the filter being selectively variable to produce changes in the amount of light transmitted by the filter to enable determination of the spacing of the fringes from the changes thus produced;
whereby the value of the fluid velocity can be measuring using the thus determined fringe spacing.

12. An apparatus for measuring the velocity of a fluid, in which a double-exposure image of the speckle pattern or particle images of tracer particles in a fluid is irradiated with a collimated beam of coherent light, and is subjected to Fourier transformation through a lens to produce at the focal plan Young's fringes which are analyzed to determine the spacing and direction of the fringes in order to measure the velocity of the fluid, comprising:

a transparent medium for recording a double-exposure image;
a lens positioned to receive a collimated lens of laser light transmitted through the double-exposure image for effecting Fourier transformation of the double-exposure image;
means disposed at the focal plane of the lens for measuring the direction of the fringes corresponding to the double-exposure image; and
means disposed at the focal plan of the lens for measuring the spacing of the Young's fringes corresponding to the double-exposure image;
whereby the velocity of the fluid can be determined using the measured direction and spacing of the fringes.

13. An apparatus according to claim 12, including a beam splitter disposed to split the light passing through the lens; and wherein the means for measuring the direction and the means for measuring the spacing of the Young's fringes are located at different positions to receive light split by the beam splitter.

14. An apparatus according to claim 13, wherein the means for measuring the direction of the Young's fringes includes a rotating slit.

15. An apparatus according to claim 13, wherein the means for measuring the direction of the Young's fringes includes means defining a fixed slit operative in response to rotation of the double-exposure image to produce changes in the amount of light transmitted through the slit to enable determination of the direction of the fringes.

16. An apparatus according to any one of claims 12 to 15, wherein the means for measuring the spacing of the Young's fringes comprises a line sensor and means for rotating the line sensor to thereby measure the intensity distribution of the fringes to enable measurement of the fringe spacing.

17. An apparatus according to any one of claims 12 to 15, wherein the means for measuring the spacing of the Young's fringes comprises a variable-spacing grating filter disposed at the focal plane of the lens and having a transmission distribution function of $\sin^2$ or $\cos^2$ which is complementary to the image of the fringes, the grating spacing of the filter being selectively variable to change the amount of light transmitted by the filter to thereby enable determination of the fringe spacing.

* * * * *